United States Patent [19]

Donnelly

[11] 4,203,418
[45] May 20, 1980

[54] EXOTHERMIC COMPOSITION AND HOT PACK

[76] Inventor: William R. Donnelly, 1237 W. High St., Piqua, Ohio 45356

[21] Appl. No.: 935,256

[22] Filed: Aug. 21, 1978

[51] Int. Cl.$^2$ ............................ C09K 5/00; F24J 1/02
[52] U.S. Cl. ..................................... 126/263; 44/3 R; 44/3 A; 252/70; 252/188.3 R
[58] Field of Search ........................... 252/188.3 R, 70; 126/263; 44/3 A, 3 R

[56] References Cited

U.S. PATENT DOCUMENTS

| | | | |
|---|---|---|---|
| 3,903,011 | 9/1975 | Donnelly | 252/188.3 R |
| 4,067,313 | 1/1978 | Donnelly | 252/188.3 R |

*Primary Examiner*—Benjamin R. Padgett
*Assistant Examiner*—Irwin Gluck
*Attorney, Agent, or Firm*—Jerome P. Bloom

[57] ABSTRACT

An exothermic composition comprises a first portion of particulate material consisting essentially of, in parts by weight, about 90 to about 140 parts anhydrous calcium chloride and about 20 to about 40 parts anhydrous sodium sulfate and about 70 to about 80 parts by weight of a solution constituting its second portion which solution consists essentially of, in parts by weight, about 45 to about 55 parts anhydrous sodium acetate and about 230 to about 280 parts of water.

A hot pack in which the composition is incorporated, consists of a sealed, impermeable, outer enclosure containing a sealed, impermeable inner enclosure, the latter containing, essentially, about 70 to about 80 parts by weight of the solution, while exterior to the inner enclosure the outer enclosure will contain, essentially, about 90 to about 140 parts by weight of anhydrous calcium chloride and about 20 to about 40 parts by weight of anhydrous sodium sulfate. The proportions of the constituents will vary somewhat in accordance with the objectives of the hot pack.

10 Claims, No Drawings

EXOTHERMIC COMPOSITION AND HOT PACK

BACKGROUND OF THE INVENTION

This invention relates to the chemical composition of a hot pack capable, when activated, of producing a safe and greatly extended exothermic reaction. The composition may be applied, for example, in a pack useful as a hand, foot or body warmer, a therapeutic device, or a device for heating foods and beverages. Its application, however, is not so limited, and such is not intended.

The composition of the invention is an improvement over that subject of U.S. Pat. No. 4,067,313, the most pertinent prior art of which the inventor and those substantively involved in the preparation of the present application are aware.

The composition of the referenced patent comprises a quantity of water and normally separated particulate material capable of producing an exothermic action when in contact with water. The particulate material of the patent consists essentially of, in parts by weight, about 40 to about 90 parts anhydrous calcium chloride, about 12 to about 25 parts anhydrous sodium acetate, and about 5 to about 15 parts calcium oxide. There is about 40 to about 90 parts by weight of the water which forms a moldable gel upon mixing thereof with the particulate material at ambient temperature. The mixture resulting is capable of producing and maintaining a temperature not in excess of about 107° C. for a period of time up to about 20 minutes.

The invention subject of U.S. Pat. No. 4,067,313 did advance the art with which we are here concerned but its useful application has proven to be limited. Embodiments have been found to lack sufficient safety factors, a problem of serious concern when they are applied to use as therapeutic devices or to warm portions of the human body. Under certain conditions the compositions of the prior art will generate pockets of steam when embodied in a sealed container, the pressures of which are sufficient to rupture the container. The possible danger in this respect is believed obvious. More than this, while the prior invention was found to extend the effective life of hot packs, it has been also found that their life must be even further extended to achieve their general acceptance in a broad spectrum of industry.

THE INVENTION

The present invention overcomes the aforementioned problems. It provides an exothermic composition the properties of which lend considerable safety in its usage and gives hot packs embodying the same a much longer useful operating life.

Preferred embodiments of the present invention provide a composition comprising particulate material consisting essentially of, in parts by weight, about 90 to about 140 parts anhydrous calcium chloride and about 20 to about 40 parts anhydrous sodium sulfate, and about 70 to about 80 parts by weight of a solution consisting essentially of, in parts by weight, about 45 to about 55 parts anhydrous sodium acetate and about 230 to about 280 parts of water.

In forming a hot pack which embodies the invention composition in proportions and within the limits of the ranges above described, one may use a container arrangement such as suggested in the U.S. Pat. No. 4,067,313. Such a container arrangement comprises a sealed, flexible, impermeable, water insoluble outer enclosure having high resistance against puncture, rupture and abrasions and a sealed, flexible, impermeable, water insoluble inner enclosure having low resistance against rupture and puncture, the inner enclosure being of a smaller size than the outer and fully disposed within the outer. The outer enclosure can contain the particulate material of the invention composition as herein specified while the inner enclosure contains the solution of anhydrous sodium acetate in water. To use the hot pack so provided, one may place it against a hard surface and rupture the inner enclosure by subjecting the pack to a sharp blow with the hand. As the inner enclosure is ruptured, the solution will flow into and mix respectively with the anhydrous sodium sulfate and anhydrous calcium chloride particles and initiate and produce an exothermic reaction from each, as each particle is gradually dissolved. The reaction causes a gelling. The respective gels produced by the anhydrous sodium sulfate coming into contact with the solution on the one hand and the anhydrous calcium chloride particles coming into contact with the solution on the other hand interact to produce therebetween an even greater exothermic reaction. The latter reaction has been found to be effective to raise the temperature of the composite gel to 235° F. The period of reaction and interaction of the constituents of the composition extends from 30 minutes to one hour, depending upon the precise proportions of the constitutents embodied in the hot pack. After the temperature of the reacted composition reaches 235° F., this temperature will be maintained for a period of time and then slowly reduce to ambient temperature.

The relative proportions of the constituents of the composition are considered critical. Omission of any constituent, or departure from the stated proportions can result in a loss of the stated and highly advantageous properties of the composition.

A more specific illustration of a preferred composition per the present invention which exhibits an optimum combination of properties particularly advantageous for use in a hot pack applied as a body warmer or therapeutic device includes particulate material consisting essentially of, in parts by weight, about 90 parts anhydrous calcium chloride and about 20 parts anhydrous sodium sulfate and, together therewith, about 70 parts by weight of a solution consisting of about 45 parts by weight of anhydrous sodium acetate and about 230 parts by weight of water. The particle size of the particulate ingredients of the composition is not critical and these ingredients may be in the form of prills or finely divided powder. The packaging of this specific composition may be such as above described and in a package wherein the outer enclosure is comprised of two superposed identical 5" by 7" rectangular sheets of film sealed together at their peripheral edges after receiving therein the particulate material consisting essentially of, in parts by weight, about 90 parts anhydrous calcium chloride and about 20 parts anhydrous sodium sulfate. The solution (about 70 parts by weight) consisting of about 45 parts by weight of anhydrous sodium acetate and about 230 parts by weight of water will be placed in a sealed impermeable film bag and introduced into the outer enclosure and to nest in the particulate material therein before the outer enclosure is sealed. The package so provided is impermeable with the outer enclosure being resistant to abrasion, puncture, penetration or rupture and the inner enclosure readily rupturable. As mentioned previously, the outer enclosure will preferably have a layer of metallic foil sealed to its outer surface for maximum efficiency in heat transfer.

In application of the hot pack for therapeutic processes or to the human body it will be understood that a layer of insulating material will be used between the skin and the pack in order to avoid direct exposure to its maximum temperature of about 235° F.

To use the illustrated specific hot pack, in the size and form described, as a body warmer, for example, prior to application of the pack adjacent the body, as previously stated, it can be placed against a firm backing surface and pressed or struck on its outer surface to rupture the inner enclosure containing the solution utilized in the composition of the present invention.

Particular attention is directed to the fact that the dry particulate materials previously isolated from the solution in the inner enclosure are each subject to direct contact by the solution which issues from the ruptured inner enclosure and as each particle is reached by the solution it will immediately commence to dissolve and to interact therewith to produce an exothermic action, without delay. The heat of the solution of the anhydrous sodium sulfate is approximately 160° F. and that of the anhydrous calcium chloride approximately 190° F. It has been found, unexpectedly, that by having the anhydrous sodium acetate initially in solution with the water and separated from the anhydrous sodium sulfate and the anhydrous calcium chloride and then bringing the solution into contact with the anhydrous sodium sulfate and the anhydrous calcium chloride the time which it takes each particle to dissolve is slowed down significantly, in comparison to what would occur if plain water were used rather than the solution. The fact that the anhydrous sodium acetate is in the solution does not diminish the effective heat of solution in any case. An interaction of the anhydrous sodium sulfate and the anhydrous calcium chloride, on contact therebetween, upon being dissolved in the solution, immediately raises the heat of the common mass so formed, which mass has assumed a gel form, so that the temperature of the mass will gradually rise to about 235° F. This has been found to occur irrespective of the ambient temperature and even when the ambient temperature is 0° F. and below. The application of the anhydrous sodium acetate initially in solution prevents freezing of the hot pack in which it is embodied even when the ambient temperature is as low as 26° below zero.

The reactions and interaction of the constituents may be accelerated and enhanced by the intermittent shaking of the hot pack.

A further point of interest is that the influence of the anhydrous sodium sulfate in the proportions described is such to also add to the enlargement of the period of heat reaction and production by the invention composition.

In the preferred embodiments of the invention it will be seen that no coatings are necessary to delay reactions in order to extend the operating life of the hot pack.

In activation of its contents the hot pack becomes a package of pliable material enabling it to mold to the configuration of the surface being heated or treated, thereby to insure optimal heat transfer.

Tests indicate that the composition will be effective to gradually increase the temperature of the hot pack so that it may be effectively used for 30 minutes to one hour until it reaches a maximum uniform temperature of approximately 235° F. which is maintained for a period of time and even thereafter the pack still has utility as it eventually reduces to ambient temperature.

Although not wishing to be bound by theory or by the precise nature of the chemical reactions which may occur, tests have indicated the constituents of the invention composition mutually interact in the manner above described.

Another embodiment of the invention in the preferred category may comprise, for example, at the upper limits of the proportions first mentioned, a composition wherein the particulate material consists essentially of, in parts by weight, about 140 parts anhydrous calcium chloride and about 40 parts anhydrous sodium sulfate. The solution which is then about 80 parts by weight of the composition will correspondingly consist essentially of, in parts by weight, about 55 parts anhydrous sodium acetate and about 280 parts water. In this particular instance the outer enclosure utilized will still be about 5" by 7" in its peripheral dimensions. The use and function of the compositions and its constituents will remain the same. The safety factors embodied in the composition permits the use of the same size container for a body warmer.

The most preferred embodiment of the invention will provide a composition comprising particulate material consisting essentially of, in parts by weight, about 115 parts anhydrous calcium chloride and about 30 parts anhydrous sodium sulfate together with about 75 parts by weight of a solution consisting essentially of, in parts by weight, about 50 parts anhydrous sodium acetate and about 256 parts water.

This last embodiment will be appropriately packaged in a manner such as previously described with reference to other preferred embodiments and function optimally in the manner described.

In any case initial production and control of the production of heat in the use of the invention composition occurs by the independent function of the anhydrous sodium sulfate and anhydrous calcium chloride with the water and the anhydrous sodium acetate in solution and thereafter by mutual interaction between resulting products. When the constituents are kept within the prescribed limits, they will function as described and, as evidenced by tests, without the formation of potentially dangerous steam pockets, thereby to eliminate problems previously existing in the use of similar hot pack devices.

Of particular note is the fact that the effective operating life of hot packs as heretofore known is not only extended but as much as doubled by reason of the invention.

The containers for the composition of the invention may of course be other than of the film type such as referred to herein and exemplified in the U.S. Pat. No. 4,067,313. It is important to consider in this respect that a great variety of materials may be used for the containers or packs, in respect to both inner and outer enclosures, in that as here utilized the anhydrous sodium acetate insures the invention composition will not attack metal nor will it carry stray electrical current. This facilitates manufacture of various embodiments of the invention. Equally important is that should the composition spill, it will not attack fabrics or finishes with undesirable consequences. The only requirement in respect to the containers and enclosures in which the composition is furnished is that the inner thereof may be opened or ruptured without breaking the seal of the outer. In this way the material of the outer serves for safe heat transfer without exposure of the chemicals.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Particulate material for producing an exothermic reaction when contacted by water, consisting essentially of, in parts by weight, about 90 to about 140 parts anhydrous calcium chloride and about 20 to about 40 parts anhydrous sodium sulfate.

2. A composition including the particulate material of claim 1 and together therewith a solution of anhydrous sodium acetate in water placed in juxtaposition to the particulate material but normally sealed therefrom until a time of use, said composition forming a gel upon contact of said particulate material by said solution and producing a temperature in the environment thereof up to 235° F. by exothermic reaction, the reaction extending for a period of time from about 30 minutes to one hour.

3. A composition as in claim 2 characterized in that said solution of said composition consists essentially of, in parts by weight, about 45 to about 55 parts anhydrous sodium acetate and about 230 to about 280 parts of water.

4. A hot pack embodying the composition of claim 2 or claim 3 including an outer enclosure having interiorly thereof a second enclosure and said second enclosure having normally sealed therein one of said particulate material and said solution, and said outer enclosure containing therein, exterior to said inner enclosure, the other of said particulate material of said solution.

5. A composition for producing an exothermic reaction over an extended period of time including the particulate material of claim 1 together with about 70 to about 80 parts by weight of an activating solution, the latter of which is in juxtaposition to said particulate material and normally sealed therefrom until a time of use, said solution consisting of water embodying a substance which in combination with the water is capable of producing in separate contact with the anhydrous calcium chloride and the anhydrous sodium sulfate particles an extended exothermic reaction with each and to form with each thereof a gel, the respective gels being operative upon contact with one another to interact and provide a secondary exothermic reaction which raises the temperature of the mass so provided up to about 235° F., the separate reactions and interaction being effective to provide a continuous raising of the temperature of the composition and the environment thereof through a period of time extending from about 30 minutes to about one hour.

6. A composition for producing an exothermic reaction over an extended period of time including the particulate material of claim 1 wherein said particulate material consists essentially of, in parts by weight, about 115 parts anhydrous calcium chloride and about 30 parts anhydrous sodium sulfate and said composition consists of said particulate material and, normally separated therefrom until a time of use, an activating solution of anhydrous sodium acetate in water.

7. A composition for producing an exothermic reaction over an extended period of time including the particulate material of claim 1 wherein said particulate material consists essentially of, in parts by weight, about 90 parts anhydrous calcium chloride and about 20 parts anhydrous sodium sulfate and said composition consists of said particulate material and, normally separated therefrom until a time of use, an activating solution of anhydrous sodium acetate in water.

8. A composition for producing an exothermic reaction over an extended period of time including the particulate material of claim 1 wherein said particulate material consists essentially of, in parts by weight, about 140 parts anhydrous calcium chloride and about 40 parts anhydrous sodium sulfate and said composition consists of said particulate material and, normally separated therefrom until a time of use, an activating solution of anhydrous sodium acetate in water.

9. A composition as in claim 6, 7, or 8 wherein said composition is embodied in a container having means defining therein a separate container area and said particulate material and said solution are sealed in said container and said separate container area, one from the other, to prevent contact therebetween until a time of use.

10. A composition as in claim 9 wherein said solution of said composition consists essentially of, in parts by weight, about 45 to about 55 parts anhydrous sodium acetate and about 230 to about 280 parts of water and the sodium acetate in said solution is effective to insure an extended reaction time as between the solution and the particles of said particulate material without materially affecting heat of solution and heat of reaction when the separate chamber area is unsealed to provide contact of said solution with the particulate material.

* * * * *